J. C. DUCKWORTH.
Looms.

No. 137,898.

Patented April 15, 1873.

6 Sheets--Sheet 1.

Witnesses
R. J. Campbell
Edw Schafer

Inventor
John C. Duckworth
by his attys
Mason Fenwick Lawrence

J. C. DUCKWORTH.
Looms.

No. 137,898.

6 Sheets--Sheet 3.

Patented April 15, 1873.

Witnesses.
R. J. Campbell
Edw Schafer

Inventor.
John C. Duckworth
by his attys
Mason, Fenwick & Lawrence

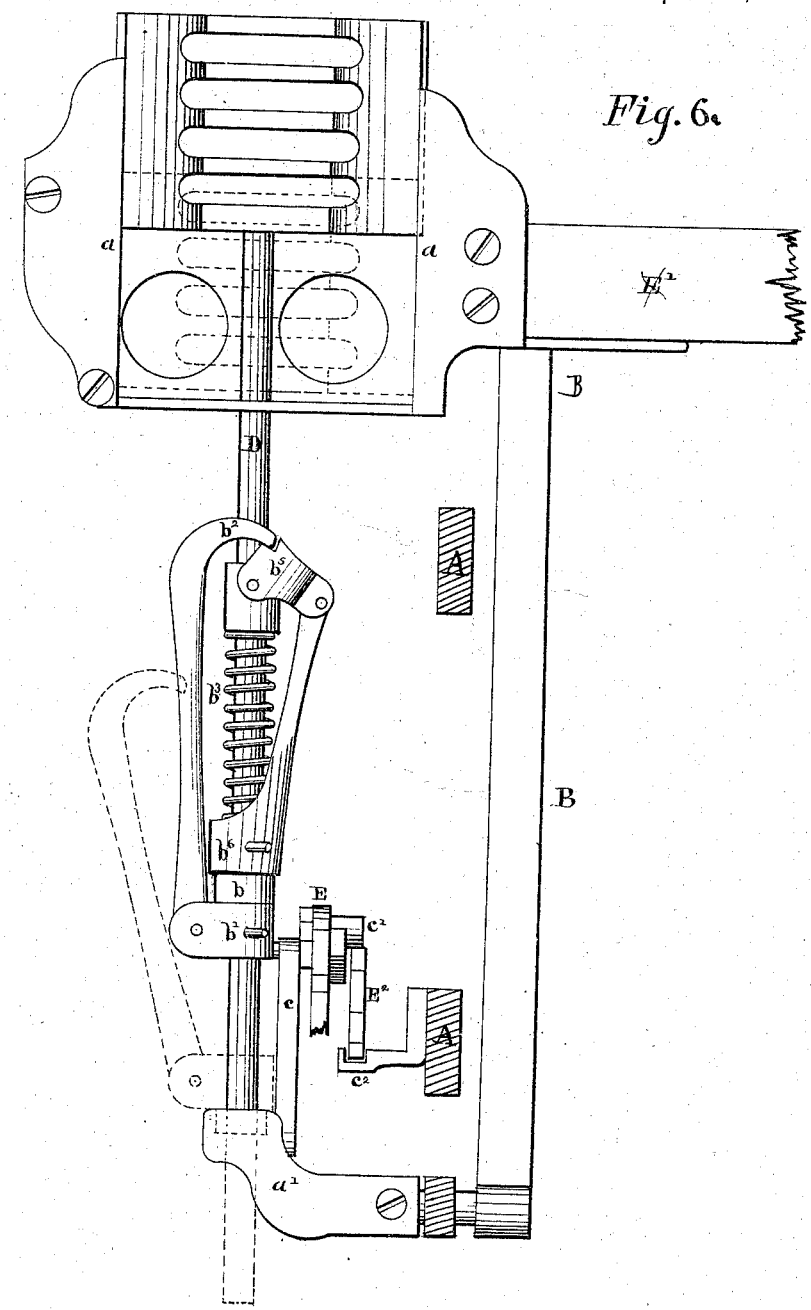

UNITED STATES PATENT OFFICE.

JOHN C. DUCKWORTH, OF MOUNT CARMEL, CONNECTICUT, ASSIGNOR TO HIMSELF, GEORGE DUCKWORTH, WILLIAM DUCKWORTH, AND JAMES DUCKWORTH, ASSIGNORS, BY MESNE ASSIGNMENTS, TO GEORGE CROMPTON, OF WORCESTER, MASSACHUSETTS.

IMPROVEMENT IN LOOMS.

Specification forming part of Letters Patent No. 137,898, dated April 15, 1873; application filed February 15, 1867.

*To all whom it may concern:*

Be it known that I, JOHN C. DUCKWORTH, of Mount Carmel, in the county of New Haven and State of Connecticut, have invented certain new and useful Improvements on Looms for Weaving Fancy Fabrics; and I do hereby declare that the following is a full, clear, and exact description thereof, reference being had to the accompanying drawings making a part of this specification, in which—

Figure 1:
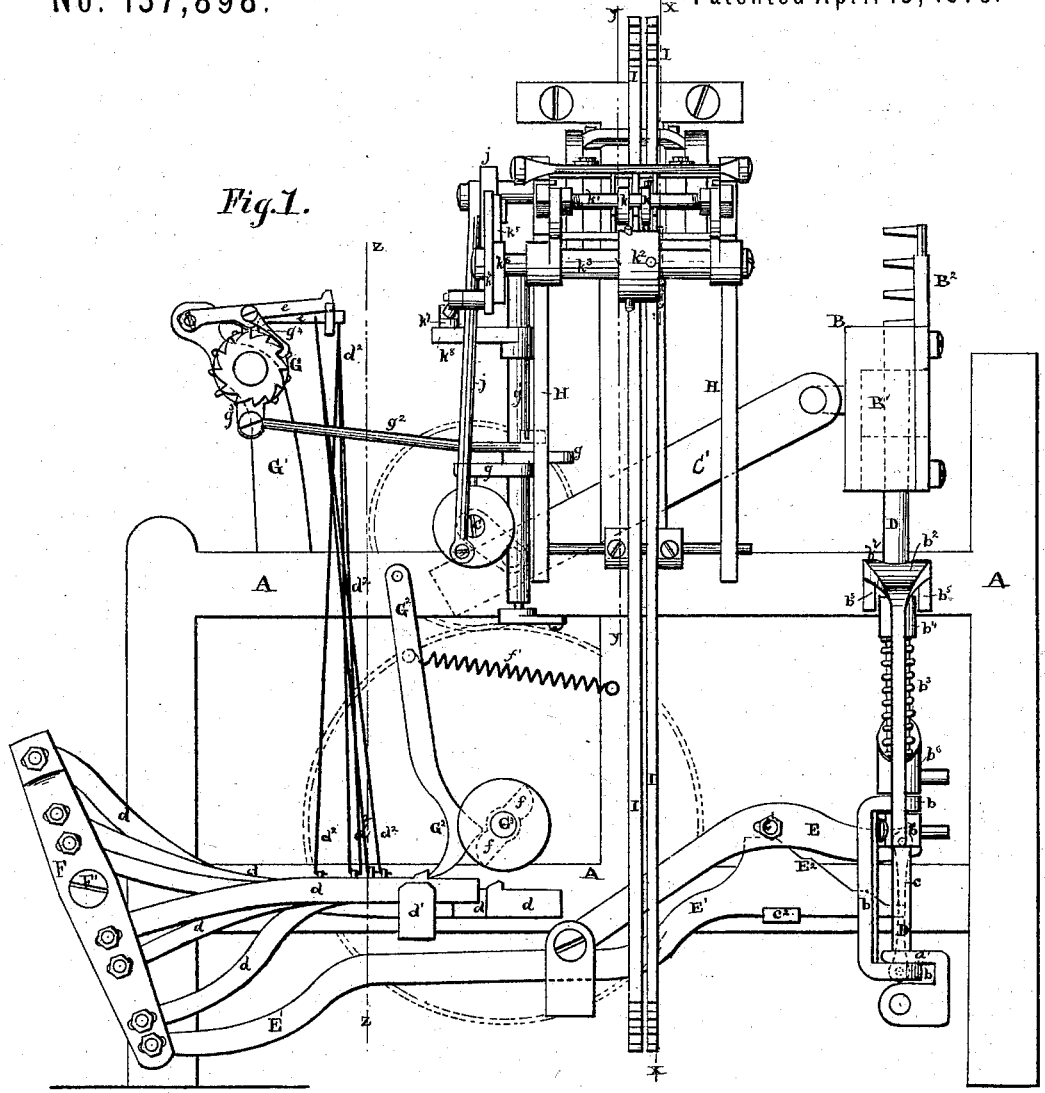
Figure 2:
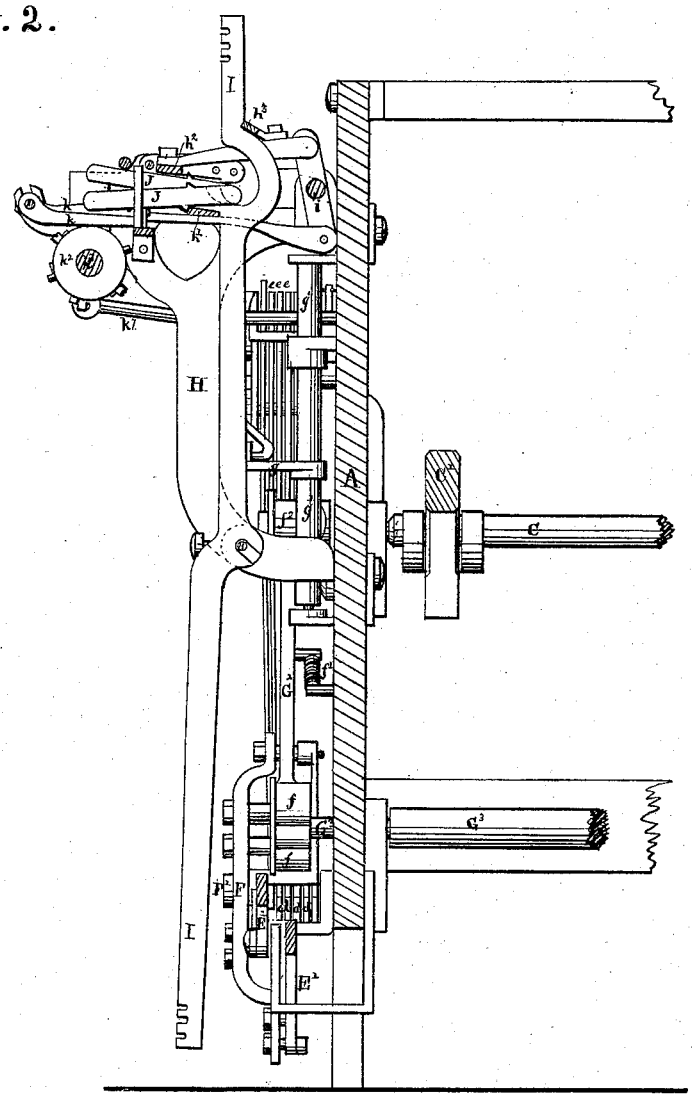
Figure 3:
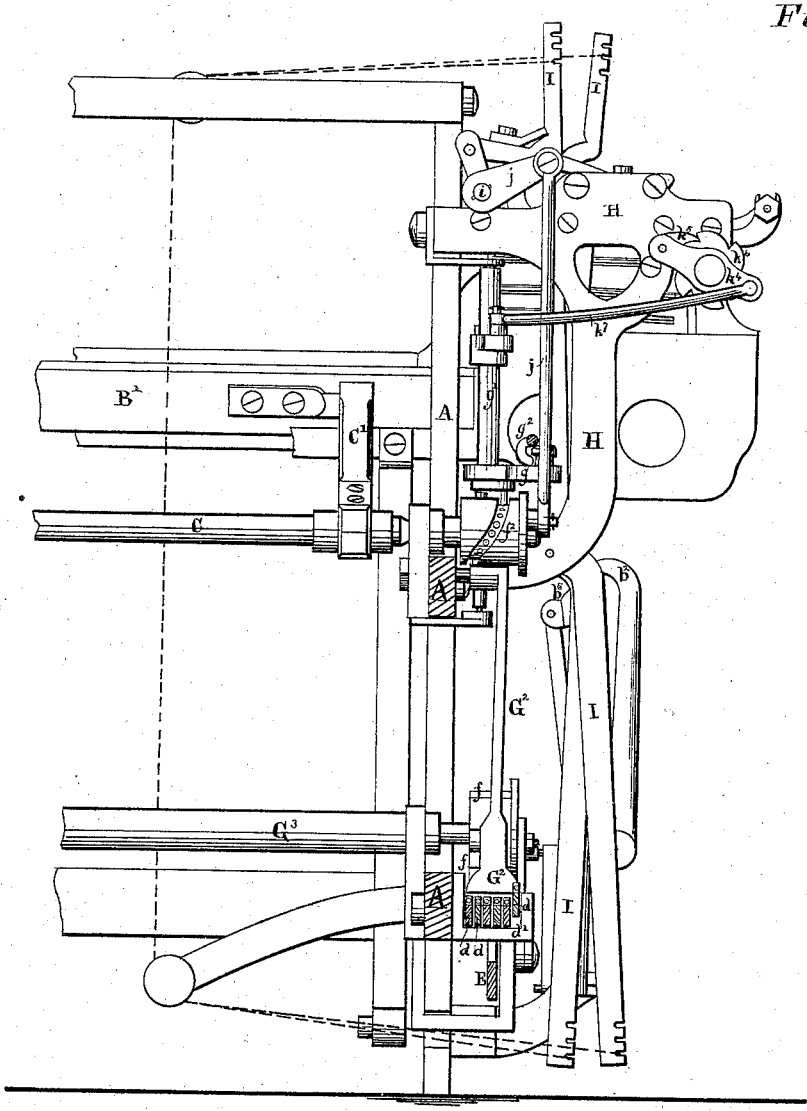
Figure 4:
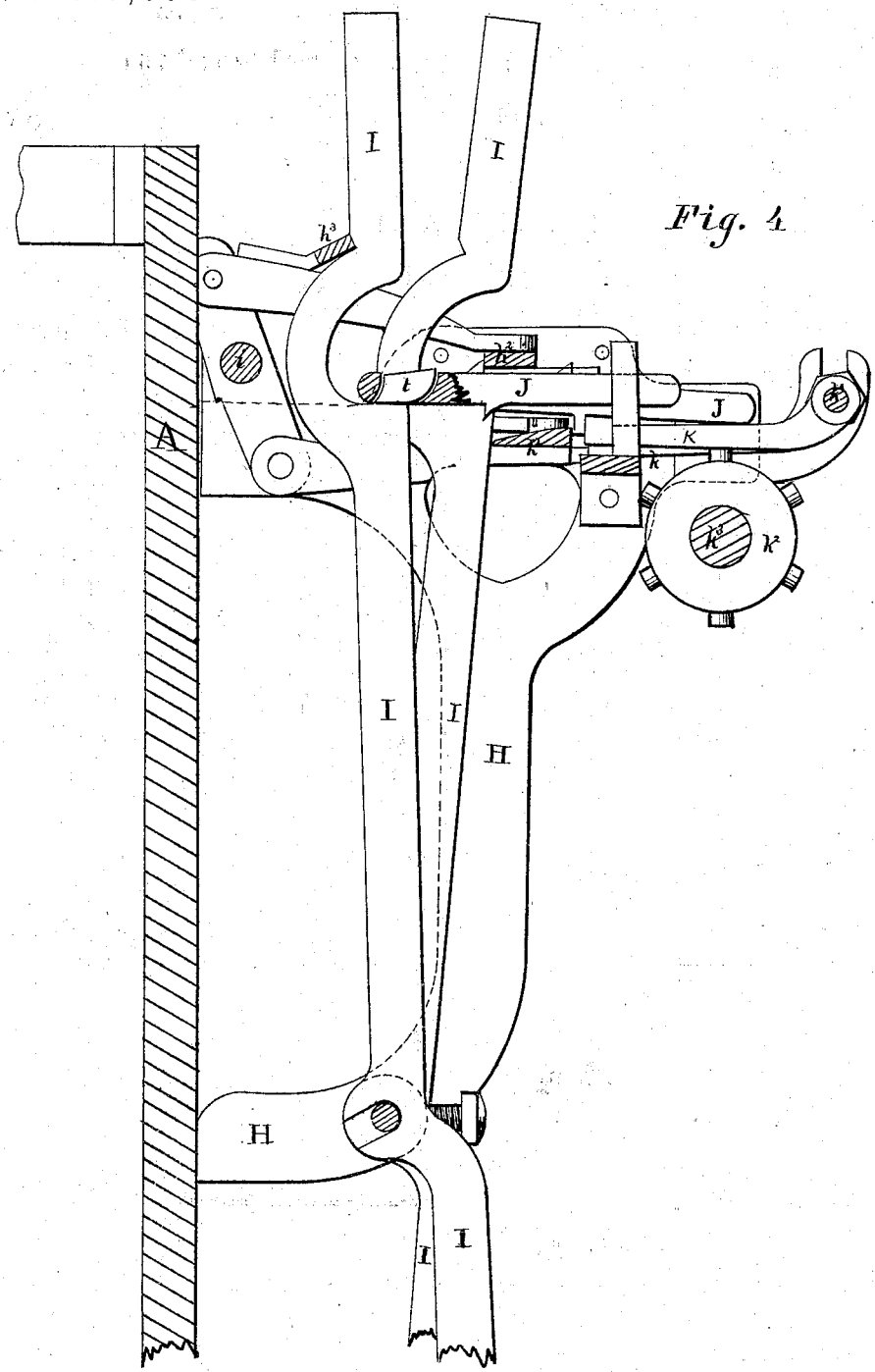
Figure 5:
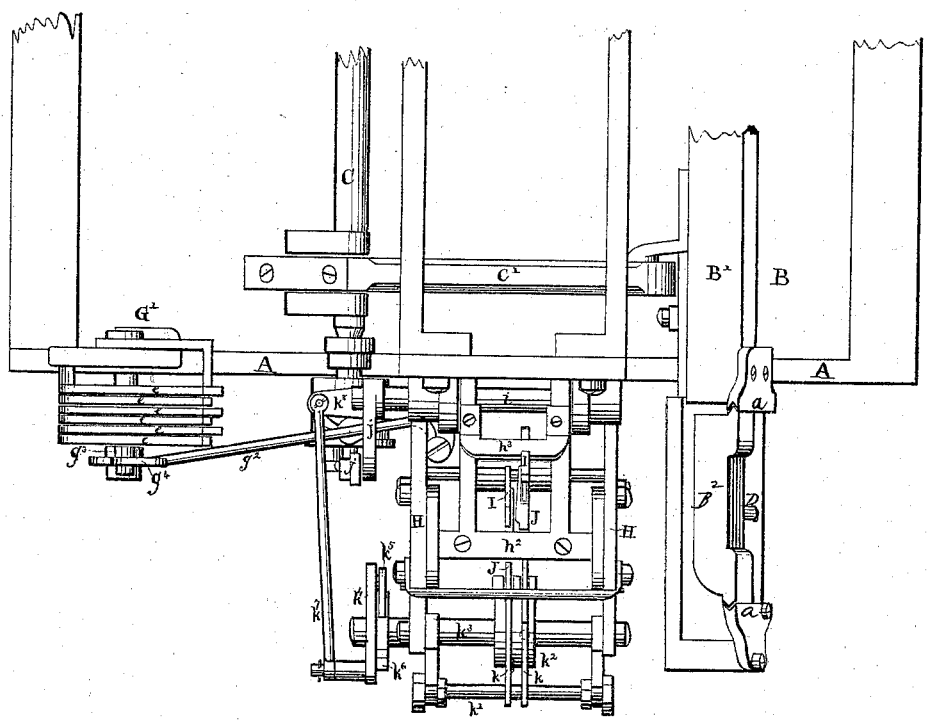

Figure 1, Sheet 1, is an elevation of one side of the improved loom. Fig. 2 is a transverse section through one side of the loom, taken in the vertical plane indicated by red line *x x* in Fig. 1, and looking toward the rear of the loom. Fig. 3, Sheet 2, is a transverse section through the loom, taken in the vertical plane indicated by red line *z z* in Fig. 1, and looking toward the front of the loom. Fig. 4 is an enlarged sectional view taken in the vertical plane indicated by red line *y y*, Fig. 1. Fig. 5, Sheet 3, is a top view of those parts of the loom shown in Fig. 1. Fig. 6 is a front view, showing a device applied to the shuttle-box rod for relieving it should the shuttle-boxes meet with undue resistance in their upward movements.

Similar letters of reference indicate corresponding parts in the several figures.

My said invention consists of several improvements, some of which relate to the mechanism for forming and shifting the shed, commonly called the harness-motion, and others relate to the mechanism for operating the series of shifting shuttle-boxes, whereby the proper shuttle is selected and brought to its place to be thrown.

Both classes of improvements may be used in the same loom, as shown, or they may be used separately in different looms, the shuttle mechanism being adapted to work in Jacquard looms.

One of my improvements in the mechanism for shifting the shuttle-boxes consists in the combination and arrangement of a spring-latch-releasing mechanism with the vertical rod which supports the shifting shuttle-boxes, and the connections which give motion to the rod, in manner substantially as hereinafter more fully described, the arrangement and combination being such that when any obstruction opposes the lifting of the boxes the latch releases the lifting mechanism from its connection with the shuttle-box rod, and thereby prevents breakage. Another of my improvements in the mechanism for shifting the shuttle-boxes relates to an improved arrangement of certain mechanism for selecting and moving the shuttle-boxes patented by Christopher Duckworth January 9, 1866, and consists in so constructing and arranging the double series of hooked jacks attached to the double rocking arm, and their connections with the pattern mechanism, that the hooked ends of both series of jacks lie horizontally side by side below the end of the pawl, instead of being arranged in separate groups, one series below the end of the pawl, and the other series above, and passing through the vibrating pawl-arm, as in the said C. Duckworth patent. By this improved arrangement, the interference of the jacks of one series with the connecting-rods from the pattern mechanism to the other series is avoided, and the advantage of having each of the jacks operated by the same pawl moving at the same velocity is also obtained.

My improvements in mechanism for forming and shifting the shed relate to that class of fancy-looms in which the leaves of heddles are sustained and lifted and depressed by a series of long upright levers, one for each leaf of heddles, hung in the middle at the side of the loom, and connected at their upper and lower ends by straps or suitable connections with their respective leaves of heddles; and my said improvements consist in combining and arranging with said long upright levers and their respective heddles a series of hooked jacks, one for each heddle-lever, said jacks being attached to the upper part of the upper arms of said levers, and arranged horizontally, or nearly so, each jack having a hook on its upper edge and a hook on its lower edge suitable to be operated by reciprocating knife-edged lifters and depressors, the combination being constructed and having the mode of operation substantially hereinafter more fully described; also, in a combination of leaves of heddles and heddle-levers, having the characteristic features hereinbefore mentioned, with a series of hooked jacks constructed and arranged in the manner described, and a pair of reciprocating knife-edged or bevel-edged blades, commonly called lifters and depressors in looms, because the motion they communicate through the jacks to the heddle-levers lifts or depresses the heddles, as the case may be, said pair of blades being arranged one above the jacks and the other below them, to reciprocate in opposite directions to each other in planes horizontal, or nearly so, and parallel, or nearly parallel, to each other; also, in combining a pattern chain or cylinder with the aforesaid combination and arrangement of lifters and depressors, jacks, heddle-levers, and heddles; also, in attaching the jacks to said long upright heddle-levers by means of a hinge or joint formed on projecting spurs of said heddle-levers, whereby the strength of the main lever is not impaired; this is of considerable importance.

In order to work the number of harnesses required in a fancy-loom, the heddle-levers have to be arranged closely together, and must also be made very thin for such long levers; and if the thickness be further reduced to make hinged connections with the jacks it weakens them greatly; therefore, in order to make a good, and comparatively permanent, connection with the jacks, without weakening the levers, I have crooked the levers and cast a spur or projection on each of them, as shown in the drawing, and connect my jacks thereto by a suitable joint.

My invention further consists in a combination of knife or bevel edged lifters and depressors, hooked jacks, and heddle-levers, wherein one of the reciprocating blades of the lifter and depressor is free to yield and give way when the jack is caught between the parallel blades as they are moving in opposite directions, thereby saving breakage.

I am aware that hooked jacks have been combined with long upright heddle-levers by means of a rack on the jack and segment of cog-teeth at the fulcrum of the heddle-levers, as in the Thomas loom; but this mode of attachment is complicated, expensive, and brings too much stress upon the jacks and knives. I am also aware that vibrating attachments, in the form of a double rack, were attached to the upper part of the heddle-levers, and operated by a cog-wheel, as in the loom described in the patent to James Greenhalgh, November 2, 1852; but such vibrating attachments were uncertain and inefficient in their action by reason of their having the mode of operation of a rack and pinion, and not the mode of operation of knives or bevel-edged blades and hooks. I do not, therefore, claim, broadly, every jack or every hooked jack in combination with the upright levers and heddles, but only the hooked jacks as herein described, arranged horizontally and attached to the upper part of the upper arms of said upright levers. My improvements give increased strength and certainty to this class of fancy-looms, wherein certainty is very important.

In the accompanying drawings, A is the frame of the loom; B, the vibrating lay, which latter receives motion from a crank-shaft, C, by means of pitman-rods C'. On the extremities of the race-beam $B^1$ guides $a\ a$ are applied for receiving the shuttle-boxes $B^2$, which are secured to the upper ends of rods D that receive an intermittent vertical motion for bringing the proper shuttles into action.

In the drawings I have represented only those parts of the loom which will illustrate the application of my invention; those parts which are not represented may be constructed in the usual well-known manner.

The lower end of the rod D passes freely through an eye which is made through an arm, $a'$, on the oscillating pivot-bearing of the lay B, which, with the upper guides $a\ a$, keep the rod and its boxes or shuttle-cells in proper position, and allow them to be elevated and depressed. A yoke, $b$, is applied loosely to the rod D, and between the eyes of this yoke a collar, $b^1$, is secured fast to said rod, to which collar an arm, having a forked hook, $b^2$, on its upper end, is pivoted. Upon the upper end of the loose yoke $b$ rests a helical spring, $b^3$, and upon the upper end of this spring is a collar, $b^4$, to which is pivoted a latch-piece, $b^5$, adapted for receiving the ends of the forked hook $b^2$, as clearly shown in Fig. 6. To the outer end of the jointed piece $b^5$ a rod which is formed on a collar, $b^6$, is pivoted. This collar $b^6$ is of such diameter as to allow the spring $b^3$ on rod D to play freely through it. The yoke $b$ is connected by a short pitman-rod, $c$, to a lifting-arm, E, a pin, $c^1$, on which rests upon the inclined stepped face of the reciprocating rod $E^1$, shown in Figs. 1 and 6.

It will be seen, by reference to Fig. 6, that when the hook $b^2$ is in its place upon the latch-piece $b^5$ the rod D will be connected to the pitman-rod $c$ so as to be elevated and depressed by the vibrations given to the arm E. Should the shuttle-boxes $B^2$ meet with undue resistance in the upward movement of the rod D, the upward pressure and movement of the yoke $b$ upon this rod will cause the jointed piece $b^5$ to throw off the hook $b^2$, and thus allow the yoke $b$ to rise upon its rod without lifting the boxes or cells. Unless these boxes are obstructed the hook $b^2$ will not be thrown off the latch-piece. The shuttle-boxes $B^2$ are moved up and down by the intermittent reciprocating movements given to the stepped inclined plane $E^2$ on the front end of the reciprocating rod $E^1$, which is pivoted at its rear end to the lower end of a vibrating lever, F, on the horizontal rock-shaft F', and supported and guided at its front end by a stirrup, $c^2$, which is made fast to the frame of the loom.

When the rod $E^1$ is moved forward its inclined plane $E^2$ will raise the arm E, which, in turn, will raise the rod D and shuttle-boxes $B^2$ a certain distance, according to the amount of forward movement given to said rod $E^1$ by the lever F. This vibrating lever F is secured fast upon shaft $F'$, and has a number of hooked arms, $d$, pivoted to it at points above and below its axis of motion, the forward ends of which rods lie side by side upon a stirrup, $d^1$, which is fast upon the loom-frame. The hooks on these arms $d$ are upon their upper edges near their front ends, and are arranged at different points on different levers. The arms $d$ are connected, by means of small rods $d^2$, to the ends of pivoted arms $e$, which rest upon the highest point of a studded cylinder, G, having its bearing upon a horizontal shaft projecting from a standard, $G^1$. The weight of the arms $d$ keeps the arms $e$ down upon the surface of the studded cylinder G, the studs on which are arranged according to the pattern which it is desired to weave, so that as this cylinder is revolved the studs upon its circumference will be brought beneath the arms $e$ at proper times, and cause them to lift the hooked arms $d$ so as to bring one of these latter arms at a time in such position as to be acted upon by a vibrating pawl, $G^2$. The pawl $G^2$ is pivoted on the side of the loom-frame, so that its lower end will lie in front of the hooks upon arms $d$, in a position to act upon the hook of any one of these arms which is raised, as above described. The width of pawl $G^2$ is equal to the width of the hooked arms $d$, collectively, and this pawl is vibrated by toes or cams $f$ on shaft $G^3$, and also by the spring $f^1$—that is to say, the cams move the pawl backward, and the spring moves it forward and keeps it in contact with the cams. The horizontal transverse shaft $G^3$ has a large spur-wheel, indicated in red, Fig. 1, upon it, which engages with a spur-wheel, also indicated in red in Fig. 1, on the crank-shaft C, which latter shaft carries a hub, $f^2$, having a cam-groove in its circumference, as shown in Fig. 3. This cam-groove communicates a backward intermittent rotary movement to the studded cylinder G through the medium of a curved lever, $g$, on a vertical rock-shaft, $g^1$, a connecting-rod, $g^2$, loose arm $g^3$, and pawl $g^4$, shown in Figs. 1, 2, 3, and 5. Those hooked arms $d$ which are pivoted to the lever F nearest its axis of motion will, when pressed backward by the pawl $G^2$, elevate or depress the shuttle-boxes the greatest distance, and those arms which are pivoted to said lever furthest from its axis will, at each backward thrust, elevate or depress the shuttle-boxes the shortest distance. The backward movements of those levers $d$ which are above the axis of lever F will elevate the shuttle-boxes, and a corresponding movement of the levers or arms $d$ which are pivoted to lever F below its axis will depress the shuttle-boxes $B^2$. It should be understood that the shaft $F'$ of lever F extends across the loom-frame, and has mechanism applied to it corresponding to that above described for operating the shuttle-boxes on the opposite end of the race-beam, so that when one set of boxes on one end of said beam is raised the opposite set will be depressed. The drawings show only one set or row of shuttle-boxes. On that side of the loom-frame upon which the parts above described and shown are arranged a secondary frame, H, is suitably secured, carrying the heddle-levers I I and the devices which operate them. They receive vibration from rectilinear reciprocating knives $h^1$ $h^2$, which work in guides upon the inner sides of the frame H, and are secured to the outer ends of arms which are pivoted to levers upon a rock-shaft, $i$. This rock-shaft $i$ receives motion from a crank-pin on the end of crank-shaft C through the medium of pitman-rod $j$ and arm $j'$. The knife or bearing $h^3$ is secured to the arms of the knife $h^2$ on the inner side of the levers I, so as to support these levers during the action of the knives $h^1$ $h^2$ upon them. Between the knives $h^1$ $h^2$, and attached by loose connections to the levers I, are the hooked jacks J J, having hooks upon their upper and lower edges, as seen in Figs. 2 and 4. These jacks are held in place between studs, and their outer ends lie upon the free ends of short arms or lifters $k$ $k$, which are pivoted to a horizontal cross-rod, $k^1$. These lifters $k$ rest upon an intermittent rotary studded cylinder, $k^2$, and are, at proper times, raised by the studs thereon. When one of these lifters is thus raised it brings the hook on its respective jack J into such position as to be acted upon by the upper knife $h^2$; the jack which is not raised is acted upon by the lower knife $h^1$; thus the two levers I receive an alternate vibrating motion. The studded cylinder $k^2$ is keyed on a shaft, $k^3$, which has an arm, $k^4$, applied loosely on one end, carrying a pawl $k^5$, which operates upon a ratchet-wheel, $k^6$, on said shaft. The arm $k^4$ is connected by a rod, $k^7$, to an arm, $k^8$, on the rock-shaft $g^1$, so that, by the oscillation of this shaft $g^1$, the studded cylinder $k^2$ is rotated. The arms of the upper knife $h^2$ are pivoted to the upper ends of the arms or levers on rock-shaft $i$, so that they are free to rise, which they will do should the knife $h^2$ catch a hook on a jack moving in a reverse direction. This prevents breaking or derangement of the loom should a jack be raised or depressed out of time. The jacks J have curved slots through their inner ends, which receive through them correspondingly-curved horns or tenons $l$, which are formed on the heddle-levers I, as clearly shown in Fig. 4. Thus I attach the jacks J to their respective levers by joints which are much stronger and which require less attention than the pin or pivotal attachments heretofore used for the purpose.

Instead of using studded cylinders, as set forth, card-patterns or pattern-chains may be employed in their stead.

Having described my invention, what I claim as new, and desire to secure by Letters Patent, is—

1. In combination with the shifting shuttle-box rod and its lifting mechanism, the hook attached to said rod and the releasing-catch with its spring and connections, substantially as described, whereby the shuttle-boxes are lifted by a positive connection, which is disconnected whenever the shuttles or the boxes meet with obstruction to their upward movement to save breakage.

2. The arrangement of the double series of hooked jacks in combination with the double lever or rocking arm, which gives motion to the stepped cam which controls the shuttle-boxes, said arrangement being and consisting of bringing the hooked ends of both series of jacks into line with each other, side by side below the pawl, so as to be operated by one pawl acting in one direction, substantially as hereinbefore described.

3. The combination and arrangement of the long upright side levers, one for each leaf of heddles and their respective leaves of heddles, with a series of hooked jacks attached to the upper part of the upper arms of said upright heddle-levers at one end of each jack, said jacks being arranged horizontally, or nearly so, and each jack having a hook on its upper edge and a hook on its lower edge suitable to receive the knife or bevel edges of the reciprocating blades of the lifters and depressors, substantially as described.

4. In combination with said series of upright heddle-levers, one for each leaf of heddles hung in the middle at the side of the loom, and connected at each end with its leaf of heddles, the series of hooked jacks, constructed and arranged with respect to the levers as hereinbefore described, and a pair of reciprocating knife or bevel edged blades, one above said jacks and the other below, and which move in opposite directions to each other in planes horizontal and parallel, or nearly so, for the purpose of lifting or depressing the heddles, the combination and arrangement being substantially as hereinbefore described.

5. In combination with the leaves of heddles, long upright heddle-levers, and the hooked jacks, a pair of reciprocating parallel blades, commonly called lifters and depressors, when one of them is free to yield and move away from the other in case of obstruction by a jack getting caught between the blades, substantially as described.

6. The horizontal hooked jacks, when hinged to spurs or projections from the upper parts of the upper arms of the upright heddle-levers at the side of the loom, in combination with said heddle-levers and their respective heddles, substantially as described.

JOHN C. DUCKWORTH.

Witnesses:
 JOHN M. TAYLOR,
 GEO. R. VAN VALKENBURG.